UNITED STATES PATENT OFFICE 2,450,131

PROCESS FOR PREPARING β-LACTONES

Hugh J. Hagemeyer, Jr., Kingsport, Tenn., assignor to Eastman Kodak Company, Rochester, N. Y., a corporation of New Jersey No Drawing. Application December 17, 1946, Serial No. 716,873

13 Claims. (Cl. 260—344)

This invention relates to a process for preparing β-lactones, i. e. lactones of β-hydroxy carboxylic acids, from ketenes and aldehydes, ketones, diketones and keto carboxylic esters.

Staudinger first showed that a keto ketene, such as diphenyl ketene, added to aldehydes or ketones to give β-lactones. Ann. 384, 38–135 (1911) and Ann. 380, 243 (1911). Staudinger also showed the addition of diphenyl ketene to unsaturated ketones, and isolated diolefins from the reaction mixture. Ann. 401, 263 (1913).

Aldo ketenes, on the other hand, are relatively unstable as compared with keto ketenes and dimerize rapidly, under ordinary conditions of temperature and pressure. In the absence of a catalyst, aldo ketenes do not condense with carbonyl compounds, but form the dimer instead. With aldehydes, the ketene dimers react to form unsaturated ketones. See Boese, United States Patent 2,108,427, dated February 15, 1938.

Kung in United States Patent 2,356,459, dated August 22, 1944, has shown that ketene

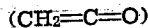

reacts with aldehydes or ketones to give β-lactones, in the presence of Friedel-Crafts type of catalysts.

I have now found that, in the presence of an ester of ortho or metaphosphoric acid, ketenes (both aldo and keto ketenes) react with carbonyl compounds selected from the group consisting of aldehydes, ketones, diketones and ketocarboxylic esters to give β-lactones, even though ketene and ketones react in the presence of ortho phosphoric acid itself to give enol acetates. See Gwynn and Degering United States Patent 2,383,965, dated September 4, 1945.

The catalysts of my process are superior to the Friedel-Crafts type of catalyst, in that separation of the β-lactone from the reaction mixture may be accomplished in the presence of the catalyst. This is important because of the instability of the β-lactones which in the case of the Friedel-Crafts type of catalyst necessitates the removal or neutralization of the catalyst before separation of the β-lactone from the reaction mixture can be satisfactorily accomplished.

It is, accordingly, an object of my invention to provide an improved process for preparing β-lactones. Other objects will become apparent hereinafter.

In accordance with my invention, I prepare β-lactones by reacting a ketene (either an aldo ketene or a keto ketene) with an aldehyde, a ketone, a diketone or a keto-carboxylic ester, in the presence of at least one ester selected from the group consisting of esters of orthophosphoric acid and esters of metaphosphoric acid.

The ketenes which are advantageously employed in practicing my invention can be represented by the following general formula:

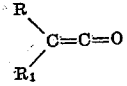

wherein R and R₁ each represent a hydrogen atom, an alkyl group (i. e. especially methyl and ethyl groups, i. e. alkyl groups of the formula $C_nH_{2n+1}$ wherein $n$ represents a positive integer of from 1 to 2) or an aryl group (especially a phenyl group, i. e. a $C_6H_5$-group). Although my invention is directed primarily to a process involving ketene ($CH_2=C=O$), any aldo ketone or any keto ketone can be employed. Typical aldo ketones include ketene, methyl ketene, ethyl ketene, etc. Typical keto ketones include dimethyl ketene, diethyl ketene, diphenyl ketene, methyl phenyl ketene, etc.

The aldehydes which are advantageously employed in practicing my invention can be represented by the following general formula:

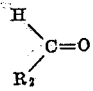

wherein R₂ represents an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aralkyl group (especially benzyl or β-phenylethyl), and an aryl group (especially a monocyclic aryl group of the benzene series, e. g. phenyl, m-tolyl and p-tolyl). My new process is especially useful for the preparation of β-lactones from aldehydes of the above general formula wherein R₂ represents a hydrogen atom or a methyl group.

The ketones which are advantageously employed in practicing my invention can be represented by the following general formula:

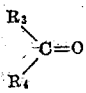

wherein R₃ represents an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aryl group (especially a monocyclic aryl group of the benzene series, e. g. phenyl, m-tolyl and p-tolyl), or an aralkyl group (especially benzyl and β-phenylethyl), and R4 represents an alkyl group (especially methyl and ethyl groups) an aryl group (especially a monocyclic aryl group of the benzene series, e. g. phenyl, m-tolyl and p-tolyl) or an aralkyl group (especially benzyl and β-phenylethyl). My new process is especially useful for the preparation of β-lactones from the above-formulated ketones wherein R4 represents a methyl group.

The diketones which are advantageously employed in practicing my invention can be represented by the following general formula:

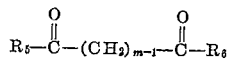

wherein R5 and R6 each represent an alkyl group (especially a methyl, an ethyl or an n-propyl group) and $m$ represents a positive integer of from 1 to 3.

The keto carboxylic esters which are advantageously employed in practicing my invention can be represented by the following general formula:

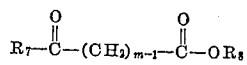

wherein R7 represents an alkyl group (especially methyl and ethyl groups), R8 represents an alkyl group (especially methyl, ethyl, isopropyl, n-propyl, n-butyl, isobutyl and secondary butyl groups) and $m$ represents a positive integer of from 1 to 3.

Typical of the aldehydes, ketones, diketones and keto carboxylic esters are: formaldehyde, acetaldehyde, propionaldehyde, n-butyraldehyde, isobutyraldehyde, phenylacetaldehyde, benzaldehyde, p-methylbenzaldehyde, crotonaldehyde, furfuraldehyde, acetone, ethyl methyl ketone, methyl n-propyl ketone, methyl isopropyl ketone, methyl n-butyl ketone, methyl isobutyl ketone, diethyl ketone, methyl isopropenyl ketone, acetophenone, methyl benzyl ketone, p-methylacetophenone, diacetyl, dipropionyl, di-n-butyryl, diisobutyryl, acetyl acetone, hexanedione-2,4, methyl pyruvate, ethyl pyruvate, methyl acetoacetate, ethyl acetoacetate, n-propyl acetoacetate, n-butyl acetoacetate, ethyl levulinate, etc.

The catalysts which are advantageously employed in practicing my invention can be represented by the following general formulas:

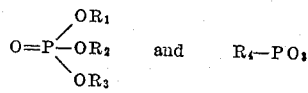

wherein R1, R2, R3 and R4 each represents a member selected from the group consisting of an alkyl group (i. e. an alcohol radical) especially a primary alkyl group of the formula $C_nH_{2n+1}$ wherein $n$ represents a positive integer of from 1 to 5, i. e. methyl, ethyl, n-propyl, n-butyl, isobutyl, n-amyl and isoamyl, and an aryl group (i. e. a phenol radical) especially an aryl hydrocarbon radical containing from 6 to 10 carbon atoms, phenyl, tolyl, and naphthyl, and R1 in addition represents a hydrogen atom.

Typical esters of orthophosphoric and metaphosphoric acids formulated above include trimethyl orthophosphate, triethyl orothophosphate, tri-n-propyl orthophosphate, tri-n-butylorthophosphate, triisobutyl orthophosphate, tri-n-amyl orthophosphate, triallyl orthophosphate, tribenzyl orthophosphate, dibenzyl orthophosphate, diethyl orthophosphate, diphenyl orthophosphate, triphenyl orthophosphate, tri-α-naphthyl orthophosphate, tri-β-naphthyl orthophosphate, ethyl metaphosphate, n-propyl metaphosphate, n-butyl metaphosphate, phenyl metaphosphate, n-amylmetaphosphate, etc.

The quantity of catalyst employed can be varied and optimum concentrations are usually a function of the reactants employed. Ordinarily a concentration of catalyst equal to from about 0.1 to about 3% by weight of the total (all reactants plus solvent, if any) reaction mixture is advantageously employed. Higher concentrations of catalyst can be used, although ordinarily there is no advantage in doing so.

Where the carbonyl compound employed is an aldehyde, it is advantageously ordinarily to add the ketene and the aldehyde simultaneously and in equimolecular proportions to the catalyst or to a medium containing the catalyst. Where the carbonyl compound employed is a ketone, diketone or a keto carboxylic ester, the ketene is ordinarily advantageously added to the ketone or keto carboxylic ester containing the catalyst.

Advantageously my new process is carried out in a solvent for the reactants, i. e. an organic liquid which dissolves both the ketene and the aldehyde, ketone, diketone or keto carboxylic ester, and which is relatively inert to the reactants. Suitable solvents include the dialkyl ethers which are liquid at 10° C., e. g. diethyl ether, ethyl isopropyl ether, diisopropyl ether, ethyl n-butyl ether, methyl n-propyl ether, etc., cyclic ethers which are liquid at 10° C., e. g. 1,4-dioxane, chlorinated hydrocarbons which are liquid at 10° C., e. g. chloroform, carbon tetrachloride, ethylidene dichloride, ethylene dichloride, etc., hydrocarbons which are liquid at 10° C., e. g. benzene, toluene, etc.

In the case of the lower aldehydes, such as formaldehyde and acetaldehyde, ketones which are liquid at 10° C. can be employed as solvents because formaldehyde and acetaldehyde react with the ketenes much faster than do the ketones to give β-lactones in accordance with my process. Acetone and methyl ethyl ketone are advantageously employed as solvents when formaldehyde or acetaldehyde is employed.

The β-lactones, themselves, are excellent solvents in which to carry out my new process and are the preferred solvents.

The process of my invention is advantageously carried out at temperatures below 50° C. Ordinarily temperatures between about 10 and about 20° C. are preferred, although temperatures as low as −50° C. can be employed.

The process of my invention can be carried out batchwise or continuously (e. g. in the continuous manner described in the copending application of Hugh J. Hagemeyer, Jr., and Delmer C. Cooper, Serial No. 660,286, filed April 6, 1946). Where ketene ($CH_2=C=O$) is prepared by the catalytic pyrolysis of acetic acid at reduced pressures, it is advantageous to carry out the process at reduced pressure in a scrubber-type reactor, e. g. ketene and formaldehyde can be reacted at reduced pressure in a scrubber-type reactor (in the manner described in the copending application of Herbert G. Stone, Serial No. 660,285, filed April 6, 1946), using β-propionolactone as a solvent and boric acid as a catalyst.

Many of the β-lactones can be distilled from the reaction mixtures under reduced pressures. However, many of the β-lactones derived from aldehydes and ketones containing olefinic or acetylenic bonds (e. g. crotonaldehyde, methyl isopropenyl ketone, furfuraldehyde, etc.) and many of the β-lactones derived from keto carboxylic esters and diketones cannot be distilled, even under reduced pressure, without undergoing decarboxylation, i. e. loss of carbon dioxide, to give unsaturated compounds. Even the lower molecular weight β-lactones derived from lower molecular weight aldehydes and ketones, e. g. formaldehyde, acetaldehyde, acetone and ethyl methyl ketone, have a tendency to polymerize when heated. With these lower molecular weight β-lactones, it is advantageous to flash distill (i. e. distill rapidly under a low vacuum, the pump producing the vacuum having a capacity greater than the volume of vapor in the still) the reaction mixture and then to purify further the β-lactone by fractional redistillation under reduced pressure.

The following examples will serve to illustrate further the manner of practicing my invention.

*Example 1.—Lactone of β-hydroxypropionic acid (β-propionolactone)*

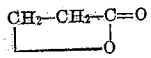

50 g. of triethyl phosphate were added to 6 liters of methyl ethyl ketone. The solution, under reduced pressure, was charged to a stainless steel scrubber-reactor exactly like the scrubber-reactor described in the copending application of Herbert G. Stone, Serial No. 660,285, filed April 6, 1946. The catalyst solution was charged into the top of the scrubber-reactor where it fell on a dispersion plate, through the openings of which it trickled down onto the berl saddle packing in the scrubber-reactor. The catalyst solution was circulated from the bottom to the top of the reactor through a conduit by means of a pump. Ketene ($CH_2=C=O$) and formaldehyde (7 g. per minute and 5 g. per minute respectively) were mixed immediately before entering the scrubber through a nozzle placed below the screen supporting the packing near the bottom of the scrubber. The scrubber and circulating lines were cooled to 0° C. The pressure drop across the scrubber was maintained at 30 to 40 mm. of Hg and the pressure at the top of the scrubber was 40 mm. of Hg. The reaction between the formaldehyde and ketene began immediately upon contact with the recirculating stream of catalyst solution and continued as the ketene and formaldehyde rose to the top of the scrubber-reactor. The β-propionolactone which was formed descended and entered a tank at the bottom of the scrubber-reactor from which it was continually removed. 3162 g. of formaldehyde and 4500 g. of ketene were bled into the scrubber during a 36 hour run. At the end of this time, distillation of the composite take-offs gave a 55% yield of β-propionolactone boiling at 82 to 83° C. at 100 mm. of Hg pressure. $N_D^{20}$ 1.4129.

*Example 2.—Lactone of β-hydroxybutyric acid (β-butyrolactone)*

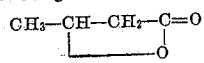

Ketene ($CH_2=C=O$) was passed into 300 ml. of an acetone solution containing 1% by weight of ethyl metaphosphate. Acetaldehyde was added simultaneously and at a rate molecularly equivalent to the ketene. In an 8 hour run, 88 g. of ketene and 90 g. of acetaldehyde were introduced, while cooling the reaction mixture at 0 to 10° C. Distillation of the resulting mixture gave 34 g. of β-butyrolactone boiling at 54° C. at 10 mm. of Hg pressure.

*Example 3.—Lactone of β-hydroxy-β-methyl-butyric acid (β-methyl-β-butyrolactone)*

2 g. of ethyl metaphosphate were added to 250 ml. of acetone. Ketene ($CH_2=C=O$) was led into the mixture through a hollow shaft high speed stirrer while the solution was held at 20° C. 42 g. of ketene were introduced over a period of 2 hours. Upon distillation of the reaction mixture, 26 g. of β-methyl-β-butyrolactone, boiling at 55° C. at 10 mm. of Hg, were obtained.

*Example 4.—Lactone of β-carbethoxymethyl-β-hydroxybutyric acid*

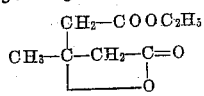

Ketene ($CH_2=C=O$) was passed into 300 ml. of an acetoacetic ester (ethyl acetoacetate) solution containing 1% by weight of a mixture consisting of approximately equal parts by weight of ethyl metaphosphate and tetraethylpyrophosphate. In an eight hour run, 84 g. of ketene were introduced, while cooling the reaction mixture at 0 to 10° C. The resulting reaction mixture consisted essentially of the above-formulated lactone. The reaction mixture was then subjected to distillation at atmospheric pressure. Decarboxylation occurred at 90 to 110° C. The residue after decarboxylation was distilled under reduced pressure and 204 g. of the ethyl ester of 3-methyl-3-butenoic acid, boiling at 54.5° C. at 20 mm. of Hg pressure, were obtained. This ester has the following formula:

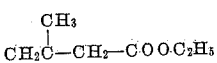

In the foregoing example ethyl acetoacetate can be replaced with methyl acetoacetate, n-propyl acetoacetate or n-butylacetoacetate for example.

*Example 5.—Lactone of β-acetylmethyl-β-hydroxypropionic acid*

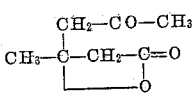

Ketene ($CH_2=C=O$) was passed in 300 cc. of an acetylacetone solution containing 1% by weight of a mixture consisting of approximately equal parts by weight of ethyl metaphosphate and tetraethyl pyrophosphate. In an eight hour run, about 84 g. of ketene were introduced, while cooling the reaction mixture at 0 to 10° C. The resulting reaction mixture contained a large proportion of the above-formulated lactone and some of the dilactone of the following formula:

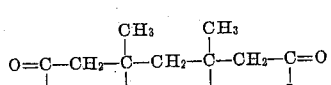

The reaction mixture was subjected to distillation at atmospheric pressure. Decarboxylation occurred and after decarboxylation 14 g. of diisopropenyl methane of the following formula:

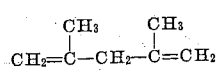

boiling at 88° C. at 735 mm. of Hg pressure and 41 g. of 2-methyl-penten-1-one-4 of the following formula:

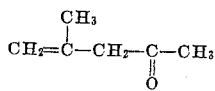

boiling at 127° C. at 735 mm. of Hg pressure were obtained.

In the manner illustrated in the foregoing examples the other β-lactones can be prepared. Thus in Example 3, if 3.5 gram-moles of propionaldehyde are employed instead of 250 ml. of acetone at 10° C., β-valerolactone of the formula:

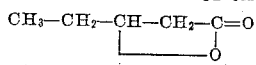

can be produced; 3.5 gram-moles of n-butyraldehyde at 10° C. gives β-caprolactone of the formula:

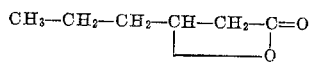

can be produced; 3.5 gram-moles of isobutyraldehyde at 10° C. gives the lactone of β-hydroxy-β-methyl-n-valeric acid of the formula:

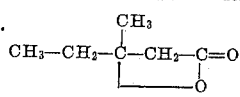

3.5 gram-moles of acetophenone at 10° C. gives the lactone of β-hydroxy-β-phenylpropionic acid of the formula:

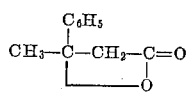

etc.

What I claim as my invention and desire to be secured by Letters Patent of the United States is:

1. A process for preparing a β-lactone comprising reacting a ketene selected from the ketenes represented by the following general formula:

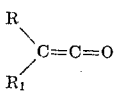

wherein R and $R_1$ each represents a member selected from the group consisting of a hydrogen atom, a methyl group, an ethyl group and a phenyl ($C_6H_5$—) group, with a carbonyl compound selected from the group represented by the following four general formulas:

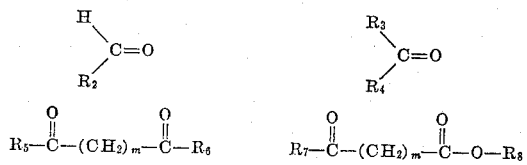

wherein $R_2$ represents a member selected from the group consisting of a hydrogen atom, an alkyl group of the formula $C_nH_{2n+1}$ wherein $n$ represents a positive integer of from 1 to 4, a benzyl group, a β-phenylethyl group and a phenyl ($C_6H_5$—) group, $R_3$ represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4 and $m$ represents a positive integer of from 1 to 3, in the presence of at least one catalyst selected from the group consisting of the esters represented by the following general formulas:

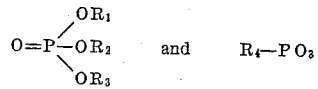

wherein $R_1$ represents a member selected from the group consisting of a hydrogen atom, a primary alkyl group of the formula $C_nH_{2n+1}$ wherein $n$ represents a positive integer of from 1 to 5, and an aryl hydrocarbon radical containing from 6 to 10 carbon atoms, and $R_2$, $R_3$ and $R_4$ each represents a member selected from the group consisting of a primary alkyl group of the formula $C_nH_{2n+1}$ wherein $n$ represents a positive integer of from 1 to 5, and an aryl hydrocarbon radical containing from 6 to 10 carbon atoms at a temperature below 50° C.

2. A process for preparing a β-lactone comprising reacting ketene ($CH_2$=C=O) with a carbonyl compound selected from the group represented by the following four general formulas:

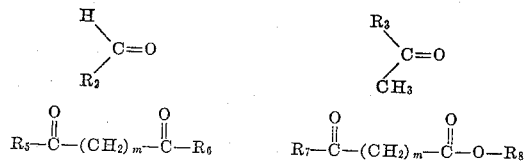

wherein $R_2$ represents a member selected from the group consisting of a hydrogen atom, an alkyl group of the formula $C_nH_{2n+1}$ wherein $n$ represents a positive integer of from 1 to 4, a benzyl group, a β-phenylethyl group and a phenyl ($C_6H_5$—) group, $R_3$ represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4, and $m$ represents a positive integer of from 1 to 3, in the presence of at least one catalyst selected from the group consisting of the esters represented by the following general formulas:

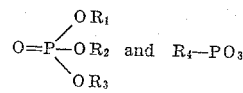

wherein $R_1$ represents a member selected from the group consisting of a hydrogen atom, a primary alkyl group of the formula $C_nH_{2n+1}$ wherein $n$ represents a positive integer of from 1 to 5, and an aryl hydrocarbon radical containing from 6 to 10 carbon atoms, and $R_2$, $R_3$ and $R_4$ each represents a member selected from the group consisting of a primary alkyl group of the formula $C_nH_{2n+1}$ wherein $n$ represents a positive integer of from 1 to 5, and an aryl hydrocarbon radical containing from 6 to 10 carbon atoms, at a temperature below 50° C.

3. A process for preparing a β-lactone comprising reacting ketene ($CH_2$=C=O) with a carbonyl compound selected from the group represented by the following four general formulas:

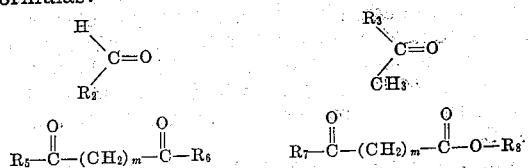

wherein $R_2$ represents a member selected from the group consisting of a hydrogen atom, an alkyl group of the formula $C_nH_{2n+1}$ wherein $n$ represents a positive integer of from 1 to 4, a benzyl group, a β-phenylethyl group and a phenyl ($C_6H_5$—) group, $R_3$ represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4, and $m$ represents a positive integer of from 1 to 3, in the presence of at least one catalyst selected from the group consisting of the esters represented by the following general formulas:

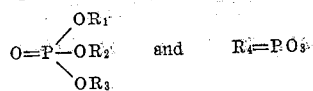

wherein $R_1$ represents a member selected from the group consisting of a hydrogen atom, a primary alkyl group of the formula $C_nH_{2n+1}$ wherein $n$ represents a positive integer of from 1 to 5, and an aryl hydrocarbon radical containing from 6 to 10 carbon atoms, and $R_2$, $R_3$ and $R_4$ each represents a member selected from the group consisting of a primary alkyl group of the formula $C_nH_{2n+1}$ wherein $n$ represents a positive integer of from 1 to 5, and an aryl hydrocarbon radical containing from 6 to 10 carbon atoms, at a temperature of from about 10 to about 20° C.

4. A process for preparing β-propionolactone comprising reacting ketene ($CH_2$=$C$=$O$) with formaldehyde, in the presence of from about 0.1 to about 3% by weight of the material in the reaction mixture of at least one catalyst selected from the group represented by the following general formulas:

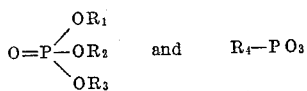

wherein $R_1$ represents a member selected from the group consisting of a hydrogen atom, a primary alkyl group of the formula $C_nH_{2n+1}$ wherein $n$ represents a positive integer of from 1 to 5, and an aryl hydrocarbon radical containing from 6 to 10 carbon atoms, and $R_2$, $R_3$ and $R_4$ each represents a member selected from the group consisting of a primary alkyl group of the formula $C_nH_{2n+1}$ wherein $n$ represents a positive integer of from 1 to 5, and an aryl hydrocarbon radical containing from 6 to 10 carbon atoms, at a temperature of from about 10° to about 20° C.

5. A process for preparing β-propionolactone comprising reacting ketene ($CH_2$=$C$=$O$) with formaldehyde, in the presence of from about 0.1 to about 3% of the weight of the material in the reaction mixture of triethyl orthophosphate, at a temperature below 50° C.

6. A process for preparing β-propionolactone comprising reacting ketene ($CH_2$=$C$=$O$) with formaldehyde, in the presence of from about 0.1 to about 3% of the weight of the material in the reaction mixture of triethyl orthophosphate, at a temperature of from about 10 to about 20° C.

7. A process for preparing β-propionolactone comprising adding ketene ($CH_2$=$C$=$O$) and formaldehyde in about equimolecular proportions to a solution of at least one catalyst selected from those represented by the following formulas:

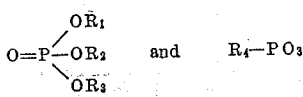

wherein $R_1$ represents a member selected from the group consisting of a hydrogen atom, a primary alkyl group of the formula $C_nH_{2n+1}$ wherein $n$ represents a positive integer of from 1 to 5, and an aryl hydrocarbon radical containing from 6 to 10 carbon atoms, and $R_2$, $R_3$ and $R_4$ each represents a member selected from the group consisting of a primary alkyl group of the formula $C_nH_{2n+1}$ wherein $n$ represents a positive integer of from 1 to 5, and an aryl hydrocarbon radical containing from 6 to 10 carbon atoms, in a solvent selected from the group consisting of acetone, ethyl methyl ketone and β-propionolactone, at a temperature below 50° C., the concentration of the catalyst being equivalent to from about 0.1 to about 3% by weight of the materials in the reaction mixture.

8. A process for preparing β-propionolactone comprising adding ketene ($CH_2$=$C$=$O$) and formaldehyde in about equimolecular proportions to a solution of at least one catalyst selected from those represented by the following formulas:

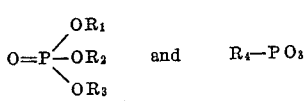

wherein $R_1$ represents a member selected from the group consisting of a hydrogen atom, a primary alkyl group of the formula $C_nH_{2n+1}$ wherein $n$ represents a positive integer of from 1 to 5, and an aryl hydrocarbon radical containing from 6 to 10 carbon atoms, and $R_2$, $R_3$ and $R_4$ each represents a member selected from the group consisting of a primary alkyl group of the formula $C_nH_{2n+1}$ wherein $n$ represents a positive integer of from 1 to 5, and an aryl hydrocarbon radical containing from 6 to 10 carbon atoms, in a solvent selected from the group consisting of acetone, ethyl methyl ketone and β-propionolactone, at a temperature of from about 10° to about 20° C., the concentration of the catalyst being equivalent to from about 0.1 to about 3% by weight of the materials in the reaction mixture.

9. A process for preparing β-propionolactone comprising adding ketene ($CH_2$=$C$=$O$) and formaldehyde in about equimolecular proportions to a solution of triethyl orthophosphate in a solvent selected from the group consisting of acetone, methyl ethyl ketone and β-propionolactone, the concentration of the triethyl orthophosphate being equivalent to from about 0.1 to about 3% by weight of the materials in the reaction mixture, at a temperature below 50° C.

10. A process for preparing β-propionolactone comprising adding ketene ($CH_2$=$C$=$O$) and formaldehyde in about equimolecular proportions to a solution of triethyl orthophosphate in a solvent selected from the group consisting of acetone, methyl ethyl ketone and β-propionolactone, the concentration of the triethyl orthophosphate being equivalent to from about 0.1 to about 3% by weight of the materials in the reaction mixture, at a temperature of from about 10° to about 20° C.

11. A process for preparing β-butyrolactone comprising adding ketene (CH₂=C=O) and acetaldehyde in about equimolecular proportions to a solution of at least one catalyst selected from those represented by the following formulas:

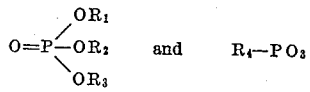

wherein R₁ represents a member selected from the group consisting of a hydrogen atom, a primary alkyl group of the formula $C_nH_{2n+1}$ wherein $n$ represents a positive integer of from 1 to 5, and an aryl hydrocarbon radical containing from 6 to 10 carbon atoms, and R₂, R₃ and R₄ each represents a member selected from the group consisting of a primary alkyl group of the formula $C_nH_{2n+1}$ wherein $n$ represents a positive integer of from 1 to 5, and an aryl hydrocarbon radical containing from 6 to 10 carbon atoms, in a solvent selected from the group consisting of acetone, ethyl methyl ketone and β-propionolactone, at a temperature of from about 10° to about 20°C., the concentration of the catalyst being equivalent to from about 0.1 to about 3% by weight of the materials in the reaction mixture.

12. A process for preparing β-butyrolactone comprising adding ketene (CH₂=C=O) and acetaldehyde in about equimolecular proportions to a solution of triethyl orthophosphate in a solvent selected from the group consisting of acetone, methyl ethyl ketone and β-propionolactone, the concentration of the triethyl orthophosphate being equivalent to from about 0.1 to about 3% by weight of the materials in the reaction mixture, at a temperature of from about 10° to about 20° C.

13. A process for preparing β-propionolactone comprising adding formaldehyde and ketene (CH₂=C=O) in about equimolecular proportions to a solution of ethyl metaphosphate in a solvent selected from the group consisting of acetone, methyl ethyl ketone and β-propionolactone, the concentration of the ethyl metaphosphate being equivalent to from about 0.1 to about 3% by weight of the materials in the reaction mixture at a temperature of from about 10° to about 20° C.

HUGH J. HAGEMEYER, Jr.

REFERENCES CITED

The following references are of record in the file of this patent:

UNITED STATES PATENTS

| Number | Name | Date |
|---|---|---|
| 2,223,548 | Caplan | Dec. 3, 1940 |
| 2,356,459 | King | Aug. 22, 1944 |

OTHER REFERENCES

Adler et al., Chem. Ind., 51, 516–21 and 557 (1942).

Certificate of Correction

Patent No. 2,450,131. September 28, 1948.

HUGH J. HAGEMEYER, Jr.

It is hereby certified that errors appear in the printed specification of the above numbered patent requiring correction as follows:

Column 6, line 40, Example 4, for that portion of the formula reading "$CH_2C$" read $CH_2=C$; column 7, line 63, claim 1, for "$C_nH_{2n\pm1}$" read $C_nH_{2n+1}$; column 9, line 33, claim 3, right-hand portion of the formula, for "$R_4=PO_3$" read $R_4-PO_3$; and that the said Letters Patent should be read with these corrections therein that the same may conform to the record of the case in the Patent Office.

Signed and sealed this 21st day of December, A. D. 1948.

[SEAL]

THOMAS F. MURPHY,
*Assistant Commissioner of Patents.*